Jan. 12, 1926.  1,569,844
J. R. O'BRIEN
PNEUMATIC OR AIR CUSHION TIRE
Filed Oct. 8, 1925
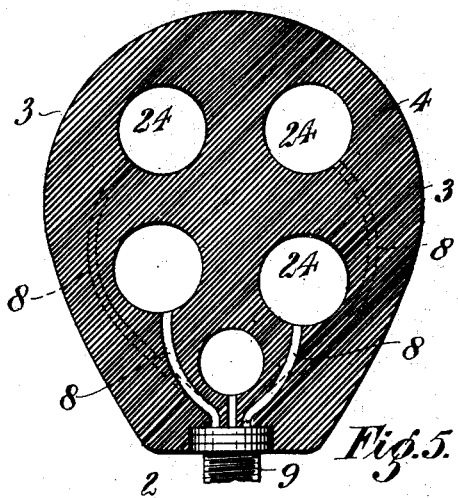
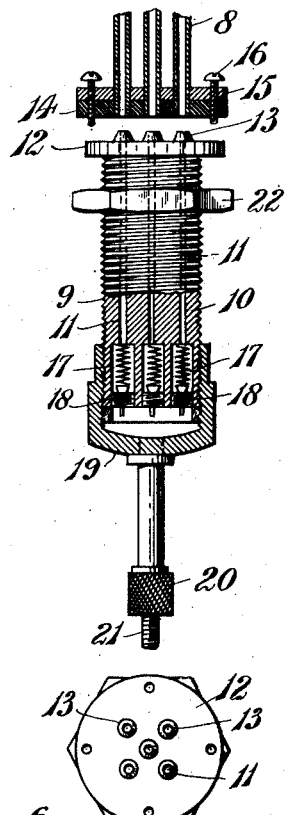
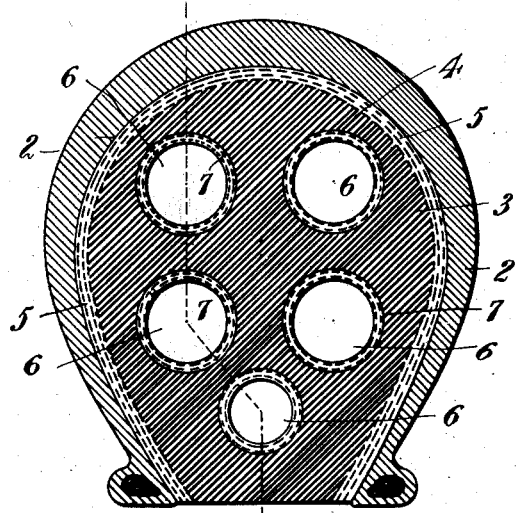
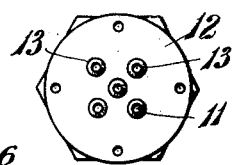
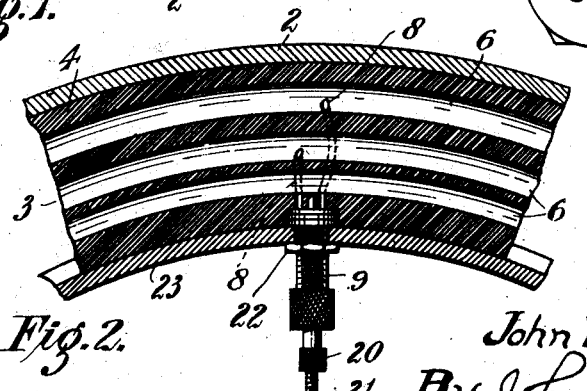
Inventor:
John R. O'Brien
By John O. Seifert
Attorney Patented Jan. 12, 1926.

1,569,844

UNITED STATES PATENT OFFICE.

JOHN ROBERT O'BRIEN, OF MARRICKVILLE, NEAR SYDNEY, NEW SOUTH WALES, AUSTRALIA.

PNEUMATIC OR AIR-CUSHION TIRE.

Application filed October 8, 1925. Serial No. 61,175.

*To all whom it may concern:*

Be it known that I, JOHN ROBERT O'BRIEN, a subject of the King of Great Britain, residing at Marrickville, near Sydney, in the State of New South Wales, Commonwealth of Australia, have invented new and useful Improvements in Pneumatic or Air-Cushion Tires (for which application for Letters Patent has been made in the Commonwealth of Australia, June 24, 1924, #18,357), of which the following is a specification.

This invention relates to improvements in pneumatic or air-cushion tires for motorcars and other vehicles and particularly to an improved construction of inner tube for use therewith. The invention provides an inner tube, which is not readily puncturable and even when punctured and partially collapsed is usable without detriment until such time as it is convenient to repair or replace it.

According to one form of the invention, I provide a tire having an inner tube the body of which is formed of solid rubber or like material having a plurality of inflatable tubes embedded therein. These tubes are preferably reinforced with fabric or like material to resist collapse, and they are connected by short tubes to an inflating valve, which is constructed having a separate nipple for each tube so that in the event of one of the tubes becoming punctured, the remaining tubes will still remain inflated.

In another form of my invention, the inflatable tubes are dispensed with and inflatable chambers are formed directly in the solid rubber of the body of the inner tube.

To aid in the description of the invention, reference is now made to the accompanying drawings wherein:—

Figure 1 is a view in cross-section of a tire having an inner tube according to the invention.

Figure 2 is a view in longitudinal section on line 2—2 of Figure 1.

Figure 3 is a detail view partly in section of the inflating valve for the inflatable tubes.

Figure 4 is a plan view of Figure 3.

Figure 5 is a view in cross-section of a modified form of inner tube included in the invention.

In the form of the invention illustrated in Figures 1 to 4 of the drawings, 2 indicates the outer cover of the tire and 3 the improved inner tube. This inner tube has its body 4 formed of solid rubber or like resilient material, and it is suitably reinforced on its outer surface by strips 5 of fabric or like material.

Embedded in the solid rubber body 4 of the tube are inflatable rubber tubes 6 of relative small diameter, preferably five in number and reinforced by stout fabric 7 or like material to enable them to resist collapse in the event of being punctured. Each of the inflatable rubber tubes 6 is connected by a short tube 8 to a common inflating valve 9. The short tubes 8 are preferably arranged as is shown in Figure 5, wherein the central tube is connected to the lowermost inflatable tube, while the other tubes 8 extend upwardly on opposite sides of said lowermost inflatable tube and are connected to the upper inflatable tubes.

The inflating valve 9 comprises a body portion 10 having a series of holes 11 bored longitudinally therein. At one end of the valve body 10 there is formed a flange 12 having a series of tapered nipples 13, which are arranged at the end of said longitudinal holes 11. Fitted over the flange 12 is a yieldable disc 14 of rubber or like flexible material, to which the ends of the short connecting tubes 8 are secured by vulcanizing or other means. This yieldable disc is tightly forced against the flange 12 of the valve body by a washer 15, which is secured to said flange 12 by screws 16. By this means the ends of the short tubes 8 are expanded over the tapered nipples 13, thus ensuring perfectly air-tight connections being formed between said tubes 8 and the longitudinal holes 11.

Formed in the valve-body 10 at the ends of the bored holes 11 are valve chambers 17, in which small nipple valves 18 of ordinary type are housed. Each of these nipple valves separately controls one of the inflatable tubes 6 so that in the event of one of said tubes becoming punctured the remaining tubes will still remain inflated.

Fitted over the end of the valve-body 10 is a cap 19, which may have a nipple valve 20 of ordinary type and a connection 21 to receive a pump or the like for inflating the tubes 6. The valve-body 10 is screw threaded exteriorly to receive a lock-nut 22, which is screwed against the rim 23 of the vehicle wheel and co-operates with the flange 12 at the end of the valve body to clamp the valve to the rim and maintain the valve in rigid position.

In constructing the improved tire tube as hereinbefore described, a tire mould is provided and the inflatable rubber tubes 6 are first arranged within said mould. The valve 9 is then fitted in position and the short tubes 8 are connected to said valve and to the respective inflatable tubes. The tubes are then partially inflated to prevent them from collapsing, and rubber dough is forced into the mould and firmly pressed around said tubes 6, the connecting tubes 8 and the upper end of the valve 9. The reinforcing strips 5 of fabric can be then wrapped around the tube and the tube vulcanized in usual manner to firmly hold the integers in place.

The improved tube can be removably fitted within the outer cover 2 in the ordinary manner, or alternatively said outer cover can be rigidly affixed to said tube by vulcanizing or other means.

When the improved tube is in use the tubes 6 are inflated to required pressure according to the type of vehicle on which the tire is used. For ordinary motor-busses or other passenger vehicles, an air pressure of approximately 40 pounds to the square inch has been found to be very satisfactory. In the event of any of the tubes 6 becoming punctured while the tire is in use, the punctured tube will not collapse completely due to the rigidity of the fabric reinforcement 7 of said tube. Furthermore, by reason of the separate nipple valve 18 for each tube the remaining tubes are not affected and they still remain fully inflated, thus enabling the tire to be used without detriment until such time as it is convenient to repair or replace the punctured tube. It will, however, be understood that a tire fitted with the improved tube is practically non-puncturable as the fabric reinforcement 5 and the solid rubber body 4 render it almost impossible for nails or other sharp objects to penetrate into the inflated tubes 6.

In the modified form of the invention as illustrated by Figure 5, a series of inflatable chambers 24 is formed directly in the solid rubber body 4 of the tube in lieu of the inflatable tubes 6, and these chambers are connected by the short tubes 8 to the common inflating valve 9 in manner hereinbefore described. The said inflatable chambers 24 may, if desired, be suitably reinforced by strips of fabric or like material embedded in the tube body and arranged around each of said chambers.

The invention is not limited to the constructions wherein five inflatable tubes or chambers are provided in the inner tube of a tire as the number of the same can be varied according to the dimensions of the tire, the type of vehicle on which the tires are used, and road travelling conditions.

What I do claim is:—

In a vehicle tire, a body arranged with a series of chambers and a tube leading from each chamber and extending through the tire body to a recessed portion in the inner circumference thereof, an inflating valve embodying a body portion having bores extending therethrough, one for each tube connected to the chambers in the tire body, and nipples projecting from one end of the valve body in line with said bores, and means to connect the valve to said tubes comprising a rigid perforated disk engaged upon said tubes, a perforated disk of yielding material at the outer side of said rigid disk and in the perforations of which yielding disk the tubes are secured, and means to secure the rigid disk to the end of the valve body with the nipples engaging in the ends of the tubes with the yielding disk interposed between the rigid disk and valve.

In testimony whereof I affix my signature.

JOHN ROBERT O'BRIEN.